United States Patent [19]
Bytow

[11] Patent Number: 4,587,716
[45] Date of Patent: May 13, 1986

[54] MACHINE TOOL CENTER WITH MULTIPURPOSE ROBOT ASSEMBLY FOR LOADING AND UNLOADING TOOLING AND WORKPIECES FROM MACHINE TOOL

[75] Inventor: Peter Bytow, Simmozheim, Fed. Rep. of Germany

[73] Assignee: Trumpf GmbH & Co., Ditzingen, Fed. Rep. of Germany

[21] Appl. No.: 618,206

[22] Filed: Jun. 7, 1984

[30] Foreign Application Priority Data

Jun. 9, 1983 [DE] Fed. Rep. of Germany ....... 3320762

[51] Int. Cl.⁴ .............................................. B23G 3/155
[52] U.S. Cl. ........................................ 29/568; 83/563; 83/701
[58] Field of Search ...................... 29/586; 83/563, 701

[56] References Cited

U.S. PATENT DOCUMENTS

| | | | |
|---|---|---|---|
| 3,339,273 | 9/1967 | Knosp | 29/568 |
| 3,816,904 | 6/1974 | Herb | 29/568 |
| 4,103,414 | 8/1978 | Herb et al. | 29/568 |

*Primary Examiner*—Donald R. Schran

[57] ABSTRACT

A machine tool center includes a machine tool, a tool storage magazine storing a multiplicity of tools, a workpiece storage area, a robot assembly, and a control system for controlling the operation of the robot assembly and of the machine tool. The robot assembly has a telescoping arm supported on a body which is movable relative to its base, and at the outer end of the arm is a gripper member which is pivotally supported intermediate its length and includes gripping elements at each of its ends. A workpiece engageable member has grippable elements thereon which can be received in the gripper member, and the gripping member will also grip tool members for movement between the tool magazine and the machine tool. Various drive units are provided for effecting movement of the various elements of the robot body. The gripper member thus serves the dual function of engaging the tooling and of engaging the workpiece engaging member to effect movement of the workpieces from the machine tool to the storage area.

10 Claims, 6 Drawing Figures

MACHINE TOOL CENTER WITH MULTIPURPOSE ROBOT ASSEMBLY FOR LOADING AND UNLOADING TOOLING AND WORKPIECES FROM MACHINE TOOL

BACKGROUND OF THE INVENTION

The present invention relates to machine tool centers, and more particularly to such centers in which tooling may be exchanged automatically between the tool mounting station of a numerically controlled machine tool and a tool storage magazine, and wherein workpieces may be automatically transported between a storage area and the work support station of the machine tool.

Various machine tools presently utilize numeric control systems for effecting machining operations upon a workpiece. Many of these tools employ the numeric control system to operate a workpiece clamp and guidance system to move the workpiece relative to the work station, or between multiple work stations of the machine tool.

Because machine tools frequently require different tooling to perform different operations on the same workpiece, there have been developed a number of devices for storing different machine tools or sets of tooling for automatic insertion and removal from tool mounting stations of the machine, or to index tooling relative to the work station. For example, in punch presses, tool carriers and turntables have been utilized to carry multiple sets of punch and die tooling. In the automatic tool changer type press, the tooling is moved from the tool magazine into tool holding fixtures by operation the numeric control system. In another type of punch press, the punch and die tooling is carried in cartridges which are manually inserted into the tool engaging fixtures.

It has also been known to employ various types of conveyors for moving workpieces onto the work support surface of a machine tool and for removing the finished products therefrom. More recently, robots have been utilized to effect such movement. It will be appreciated that it is necessary to effect precise control over the operation of the machine tool, the movement of any tooling into and from the tool mounting station and the movement of the workpiece relative to the work station. Moreover, it will also be appreciated that separate computer numeric control systems for effecting various operations will increase the cost thereof, as well as introduce the potential for error or for greater cost in the coordination of the various elements of the machine tool center.

It is the object of the present invention to provide a novel machine tool center wherein a robot is utilized readily to effect movement of tooling between the tool mounting station of the machine tool and a tool magazine and to effect movement of the workpieces between a storage area and the work support station of the machine tool.

It is also an object to provide such a center wherein a common numeric control system effects coordinated operation of the machine tool and of the robot in its various activities.

Another object is to provide such a machine tool center in which the robot arm readily grips either tooling or workpieces so that both operations may be effected expeditiously.

SUMMARY OF THE INVENTION

It has now been found that the foregoing and related objects and advantages can be readily attained in a machine tool center which includes a machine tool for performing work upon a workpiece and having a work support station and at least one tool mounting station, a tool storage magazine spaced from the machine tool and having a multiplicity of tool storage positions storing therein tool members with grippable elements thereon, and a workpiece storage area spaced from the machine tool. A robot assembly is provided to insert and remove tools from the magazine and the tool mounting station and to transport them therebetween; it also moves workpieces between the work support station and the workpiece storage area. A control system is also provided for controlling the operation of the robot and of the machine tool.

The robot assembly has a base, a body movable on the base at least about a vertical axis, a telescoping arm extending horizontally from the body and which is variable in length by telescoping movement thereof, and gripping means pivotably supported intermediate its length at the outer end of the arm for pivotal movement about a vertical axis and including gripping elements at each end thereof. Also included in the robot assembly is workpiece engageable means adapted to engage workpieces for movement between the work support station and the workpiece storage area, and it has grippable elements thereon. Each of the gripping elements of the gripping means is configured and dimensioned to grip the grippable elements of the tool members and of the workpiece engageable means. Drive means is also provided in the assembly for effecting movement of the body on the base, telescoping movement of the arm, and movement of the gripping means to grip and release the tool members and the workpiece engageable means. This drive means is controlled by the control means.

In its preferred embodiment, the workpiece storage area has at least two stations, one of which is for workpieces before working thereon in the machine tool and the other of which is for workpieces after working thereon. The robot assembly is operable to effect movement of workpieces between the support station and each of such storage stations. There is also included a standby station for the workpiece engageable means, and the robot assembly is operable to effect release and engagement of the workpiece engageable means at the standby station in response to operation of the control means.

Desirably, the workpiece engageable means has a pair of grippable elements adapted to be engaged by the gripping elements at the opposite ends of the gripping means. The robot assembly is also movable vertically on the base to position the arm at different heights, and the tool storage magazine has a multiplicity of vertically spaced storage portions and a multiplicity of horizontally spaced storage positions.

Preferably, the gripping elements of the tool members and of the workpiece engageable means are similarly configured. The grippable elements conveniently are of generally rod-like configuration. The gripping means is pivotable 180° to locate its axis parallel with that of the arm to utilize one of the gripping elements to engage a first tool member for insertion of its tooling into the tool mounting station and thereafter to utilize the other of the gripping elements to engage a second tool member while a portion of the first tool member remains in the first gripping element and the tooling therefrom is in use. It is also pivotable 90° so that its axis extends perpendicularly to that of the arm to engage the grippable elements of the workpiece engageable means. Each of the tool members preferably has a retainer releasably seating a plurality of tools at one end thereof and with the grippable element at the other end thereof.

DETAILED DESCRIPTION OF THE ILLUSTRATED EMBODIMENT

Figure 1:
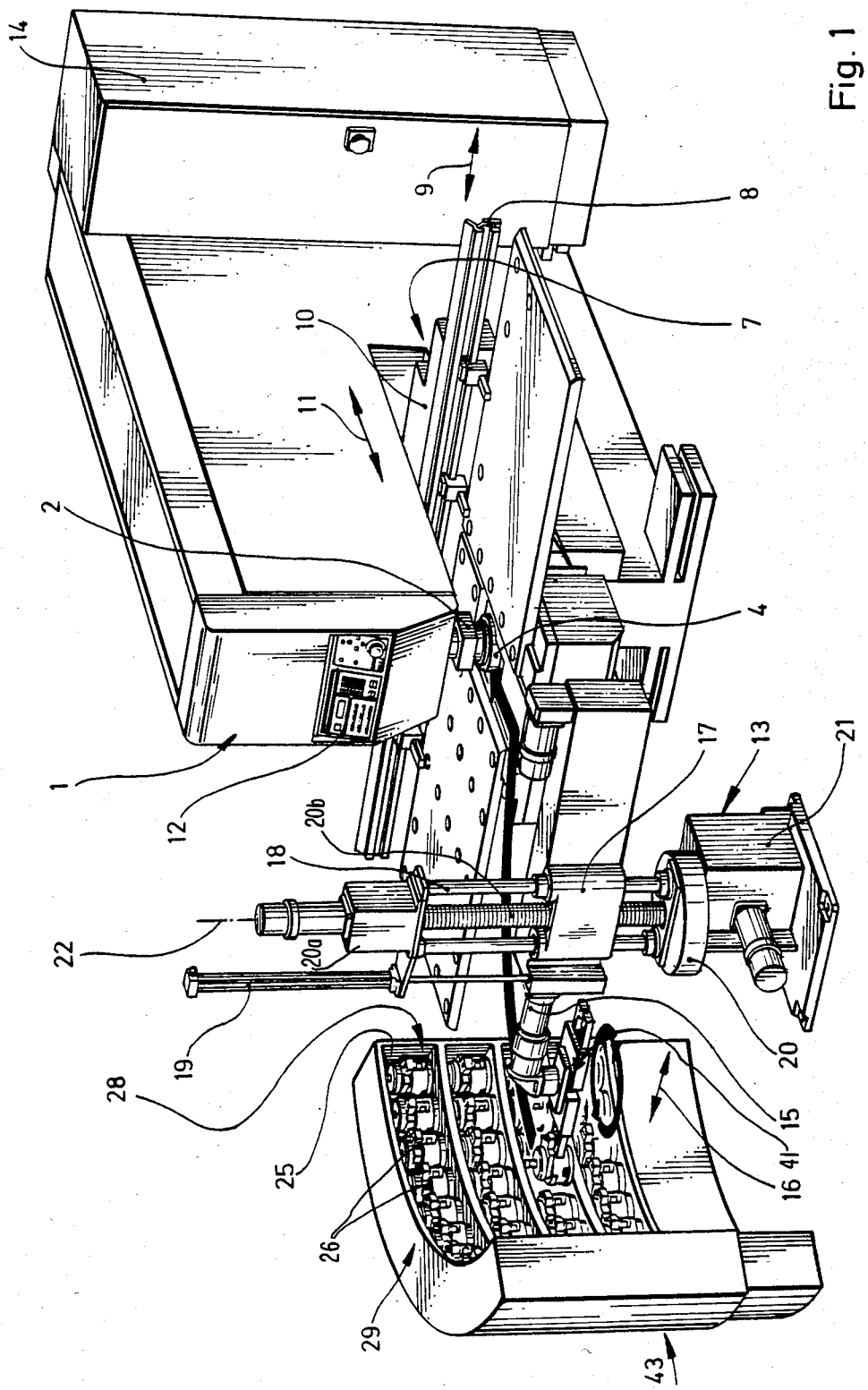
FIG. 1 is a perspective view of a machine tool center embodying the present invention and including a multiplicity of arrows indicating motions and directions of movement, but omitting the workpiece storage area for purposes of clarity illustration.
Figure 2:
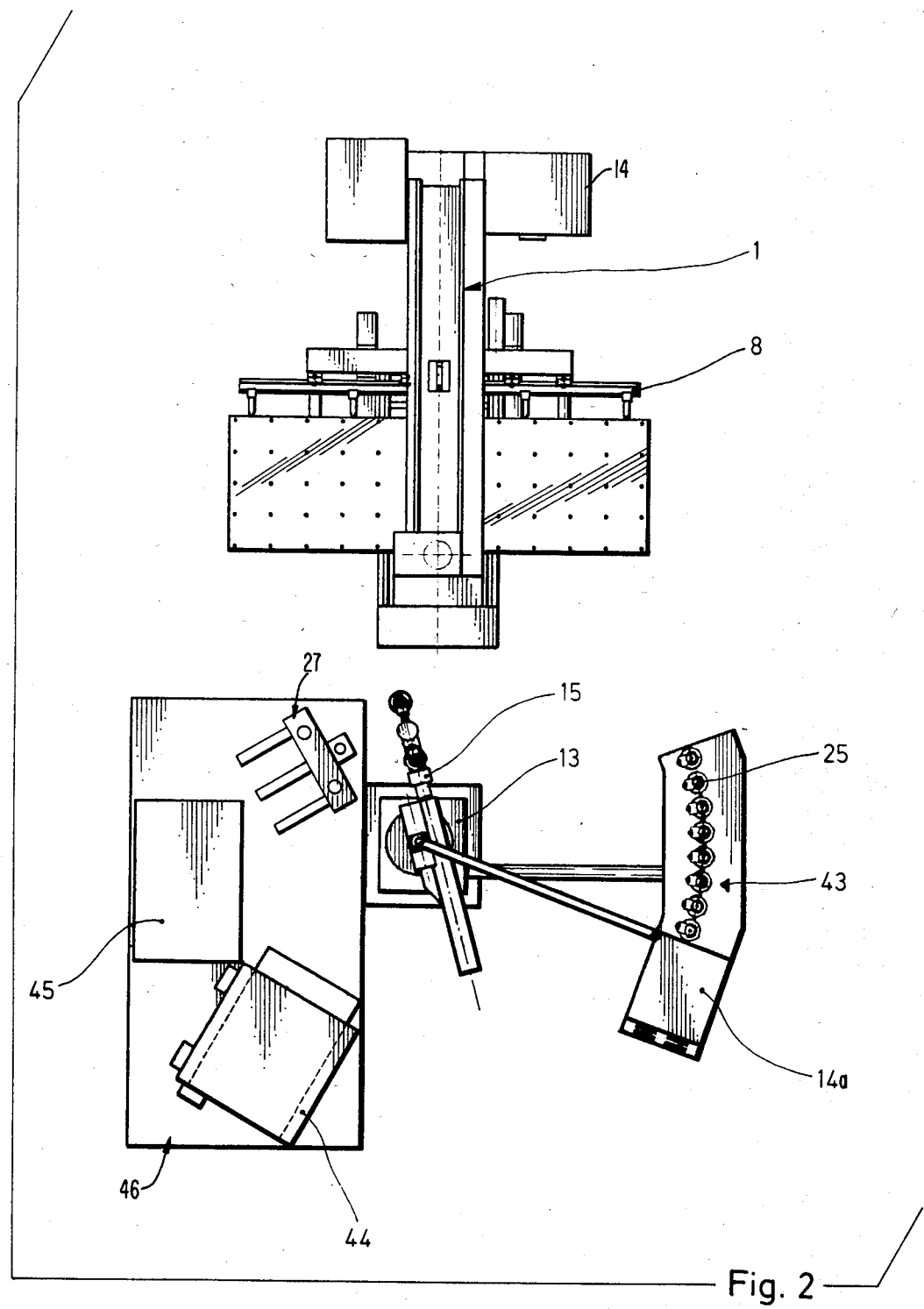
FIG. 2 is a top view thereof with the top wall of the tool magazine removed to illustrate the tool members stored therein, and also illustrating the workpiece storage area.

Turning first to FIGS. 1 and 2, a machine tool center embodying the present invention is illustrated therein and includes a punch press generally designated by the numeral 1, a tool magazine generally designated by the numeral 43 and located at a position spaced from the punch press 1, a storage table generally designated by the numeral 46 (seen in FIG. 2), and a robot assembly generally designated by the numeral 13.

The punch press 1 is of the manual tool changer type and has an upper tool mounting station 2 to receive and mount the punch therein, and a lower tool mounting station 4 to receive and mount the die therein. The work station is defined between the two tool mounting stations 2 and 4. Not shown is a stripper mounting assembly, which is frequently employed in connection with such punch presses. To effect movement of the workpiece relative to the work station, there is provided a workpiece clamping and guidance assembly generally designated by the numeral 7, which includes the crossbar 8, and the coordinate carriage 10. By this assembly, it is possible to effect movement of the workpiece in the direction of the double-headed arrows 9 and 11 relative to the work station. On the face of the punch press is a control panel 12 which is operatively connected to the computer numeric control 14 that functions to control the operations of the workpiece clamping and guidance system 7 and the operation of the punch, as well as of the clamping elements in the tool mounting stations 2 and 4.

Turning now to the tool storage magazine 43, it is generally comprised of an arcuate housing 29 having a series of vertically spaced shelves or rows 28, thus defining a multiplicity of vertically and horizontally spaced tool storage areas 25, each capable of receiving a tool assembly or cartridge 26 to be described more fully hereinafter.

The robot assembly 13 includes a base or support 21, a guide mechanism comprised of the elements 20 and 20a supported thereon for rotation about the column 20b, and a pair of vertically extending spaced guidebars 18 extending between the elements 20 and 20a. Supported on the guidebars 18 is the robot body 17, which is movable vertically between the elements 20a and 20b by the pneumatically or hydraulically operated elevator mechanism 19 carried by the upper element 20a of the guide mechanism. Extending horizontally from one side of the robot body 17 is a telescoping arm 15 which can move inwardly and outwardly by telescoping action in the direction indicated by the double arrow 16. At the outer end of the telescoping arm 15, is the gripper member generally designated by the numeral 41 and which will be described in greater detail hereinafter.

Disposed within the several enclosures of the robot assembly 13 are hydraulic or pneumatic mechanisms for effecting the vertical movement of the body 17, for rotating the entire guide mechanism 20 upon the base 21, for effecting telescoping movement of the arm 15, and for effecting release and closing of the gripper member 41.

The storage table 46 has a first storage area 44 in which are located the workpieces prior to action thereon by the punch press 1, and a finished piece storage area 45 for storage of the workpieces after processing in the punch press 1. As also seen in FIG. 2, a portion of the table 46 provides a standby position in which the workpiece engaging means, generally designated by the numeral 27, is placed when it is not in use.

Figure 3:
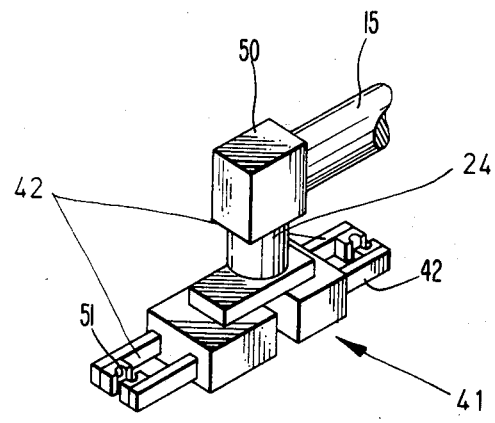
FIG. 3 is a fragmentary perspective view to an enlarged scale of the outer end of the robot arm without any member being gripped therein.

Turning now to FIG. 3, the gripper member 41 is more clearly illustrated. At the outer end of the arm 15 is a rotary mounting box 50 in which is seated the swivel joint 24 so as to permit rotation or pivoting of the gripper member 41 about the axis of the joint 24. The gripper member 41 is symmetrical about its center or swivel joint 24, and it has at either end clamping fixtures 42 which can be opened and closed by a hydraulic or pneumatic mechanism within the gripper member 41. These clamping fixtures 42 include a pair of spaced clamps defining opposed arcuate faces 51.

Figure 4:
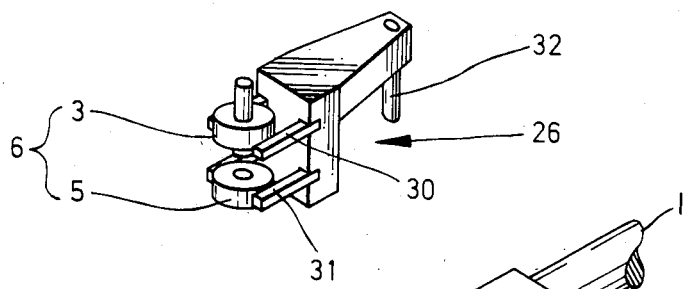
FIG. 4 is a perspective view to an enlarged scale of a tool member of the type stored in the tool magazine.

Turning now to FIG. 4, a tool member or cartridge assembly generally designated by the numeral 26 is therein illustrated. At one end are provided a vertically spaced pair of gripping elements 30 and 31 which are adapted to be opened and closed by a pneumatic or hydraulic mechanism contained therewithin so as to clamp or release the upper die 3 and lower die 5, which together comprise the tool assembly 6. At its opposite end, the cartridge 26 has a depending rod 32 which is of generally cylindrical configuration so as to be securely clamped in the arcuate faces 51 of the clamping fixtures 42 which are illustrated in FIG. 3.

Figure 5:
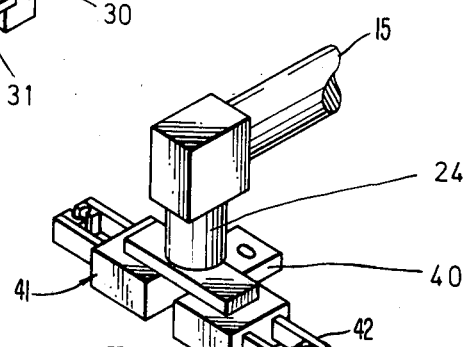
FIG. 5 is a view similar to FIG. 3, with the gripping member pivoted 90°.

Turning now to FIG. 5, the gripper member 41 has been rotated 90° from the position seen in FIG. 3, so that its axis is perpendicular to the axis of the arm 15. Also seen in this view is a coupling 40 which projects along an axis parallel to the arm 15 in this particular position of rotation and which will be described more fully hereinafter.

Figure 6:
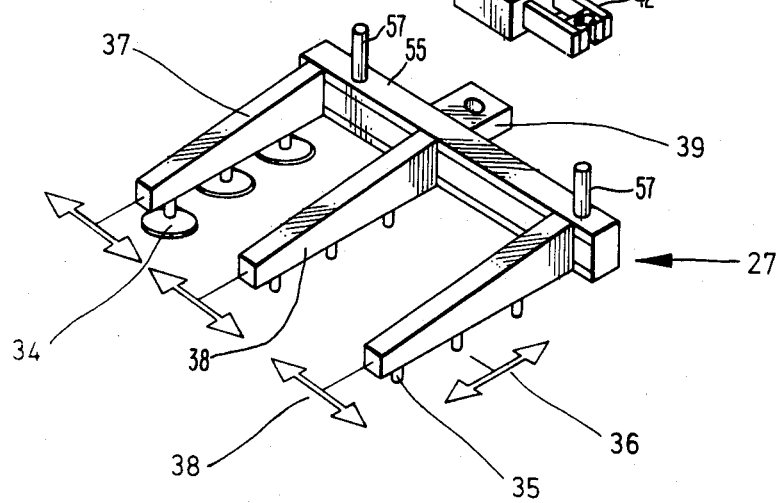
FIG. 6 is a perspective view of a workpiece engageable member for transporting workpieces.

Turning now to FIG. 6, the workpiece engaging member 27 is illustrated as including a transverse bar 55, a series of 3 arms 37 and 38 projecting in one direction therefrom, and a coupling 39 projecting in the opposite direction therefrom. Extending upwardly from the bar 55 are a pair of cylindrical pins or rods 57, which are adapted to be clamped in the arcuate gripping surfaces 51 of the clamping fixtures 42 of the gripper member 41.

For purposes of illustration, two different forms of mechanisms for engaging the workpiece are shown as being provided upon the several arms 37 and 38. On the arm 37, suction cups 34 are shown; on the arms 38 electromagnets 35 are shown. Either or both forms of workpiece gripping elements may be employed if so desired. The coupling 39 is configured and dimensioned to register with the coupling 40 on the gripper member 41 when the workpiece engaging member 27 is assembled thereto so that the power to operate either the suction cups 34 or the electromagnets 35 will automatically be coupled. The several arms 37, 38 are slidably supported upon the crossbar 55 for movement in the manner indicated by the arrows so as to decrease or increase the spacing therebetween.

In this particular embodiment, a satellite control 14a is provided at one end of the tool magazine 43 to supply additional memory and more finite control for operation of the robot assembly 13. It is coupled to the main control mechanismm 14 for the punch press 1 so that its operations are synchronized and generally directed thereby. If so desired, the satellite control 14a can be eliminated by providing increased memory and operating functions in the main control 14 for the punch press 1.

Turning now to the operation of the illustrated embodiment, the robot assembly guide mechanism 20 is rotated on the support 21 by operation of the control 14 (and 14a) so as to orient the arm 15 in a position to pick up the desired tool cartridge 26 from the tool magazine 43. Depending upon the vertical row 28, the elevator mechanism 19 may be actuated to elevate or lower the body 17 and thereby the arm 15 into alignment therewith. The control 14 (and 14a) then effects telescoping movement of the arm 15 so as to move the gripper member 41 to bring a clamping fixture 42 against the rod 32 of the tool cartridge 26. At this point, the clamping fixture 42 closes down so as to tightly engage the rod 32 therein.

The control 14 then effects inward telescoping movement of the arm 15 and pivoting of the guide mechanism 20 in the direction indicated by the elongated arrow in FIG. 41 so as to bring the arm 15 into alignment with the upper and lower tool mountings 2 and 4. It then effects extension of the arm 15 to move the upper and lower dies 3,5 into the tool mountings 2 and 4, which then are actuated to clamp them therein. The clamping fixtures 42 are simultaneously released and the arm 15 is then retracted and swiveled along generally the same path to another position in alignment with another tool cartridge 26 in the tool magazine 43.

As will be appreciated, the tool carrier is still disposed in the first clamping fixture 42, although the tooling therefrom is located in the tool mountings 2,4. The control 14 then effects 180° rotation of the gripper member 41 to orient the other clamping fixture 42 in the outwardly extending position. At this point, the control 14 then effects outward telescoping movement of the arm 15 to engage the new tool cartridge 6. Thus, the robot assembly 13 is in a position to quickly remove the tooling presently disposed in the tool mountings 2, 4, after which the gripper member 41 is rotated 180° to insert the newly captured tooling therein. This process is repeated as required throughout operation upon a single workpiece.

When it is desired to remove the workpiece from the punch press 1, the robot assembly 13 is rotated into the selected positions to deposit the tool member cartridges 26 in their storage positions. The control then effects rotation of the guide mechanism 20 to orient the arm 15 over the standby position of the support table 46 on which the workpiece engaging member 27 has been stored. The now empty gripper member 41 is rotated into the position shown in FIG. 5, and aligned over the workpiece engaging member 27. It is then moved downwardly by the elevator mechanism 19 to locate the upstanding rods 57 in the clamping fixtures 42, which are then closed to securely engage them therein.

The arm 15 is then retracted as necessary and the robot body 17 swiveled to orient the workpiece engaging member 27 over the workpiece on the punch press 1. The elevator mechanism 19 is actuated to move the member 27 against the workpiece. Suction or electrical power is supplied to the workpiece engaging member 27 so as to couple the workpiece to the member 27, and the arm 15 is retracted to move the workpiece outwardly from the punch press 1. The body 17 is then swiveled about the support 21 to locate the workpiece over the finished piece storage area 45, and the elevator mechanism 19 is actuated to lower the finished workpiece into the desired horizontal position after which the power securing the workpiece thereto is disengaged to release the workpiece therefrom.

The robot assembly 13 may then be rotated to engage a new workpiece from the workpiece storage area 44 and to move it into position in the punch press by a series of steps similar to but reverse from those utilized for the removal of the finished workpiece. Thereafter, the workpiece engaging member 27 may be moved to the standby position on the storage table 46, and the robot assembly 13 then rotated to pick up tooling from the tool magazine 43 as has been hereinbefore described.

Thus, it can be seen that the machine tool center of the present invention is one in which a robot assembly may be expeditiously and efficiently utilized to exchange tooling between a tool magazine and tool mounting stations of the machine tool, and workpieces between a storage area and the workpiece support station of the machine tool. The center is readily adapted to use of a common computer numeric control system for both the machine tool operation and the operation of the robot and its various components.

Having thus described the invention, I claim:

1. In a machine tool center having (1) a machine tool for performing work upon a workpiece and having a work support station and at least one tool mounting station, (2) a tool storage magazine spaced from said machine tool and having a multiplicity of tool storage positions having stored therein tool members with grippable elements thereon, and (3) a workpiece storage area spaced from said machine tool, the combination therewith of:
    (A) a robot assembly for inserting and removing tools from said magazine and said tool mounting station and transporting them therebetween, and for moving workpieces between said work support station and said workpiece storage area; and
    (B) a control system for controlling the operation of said robot and of said machine tool, said robot assembly having:
      (i) a base;

(ii) a body movable on said base at least about a vertical axis;

(iii) a telescoping arm extending horizontally from said body, said arm being variable in length by telescoping movement thereof;

(iv) gripping means pivotably supported intermediate its length at the outer end of said arm for pivotal movement about a vertical axis and including gripping elements at each end thereof;

(v) workpiece engageable means adapted to engage workpieces for movement between said work support station and said workpiece storage area, said workpiece engageable means having grippable elements thereon, each of said gripping elements of said gripping means being configured and dimensioned to grip said grippable elements of said tool members and of said workpiece engageable means; and (vi) drive means for effecting movement of said body on said base, telescoping movement of said arm, and movement of said gripping means to grip and release said tool members and said workpiece engageable means, said drive means being controlled by said control means.

2. The combination in accordance with claim 1 wherein said workpiece storage area has at least two stations, one of which is for workpieces before working thereon in said machine tool and the other of which is for workpieces after working thereon, and wherein said robot assembly is operable to effect movement of workpieces between said support station and each of such storage stations.

3. The combination in accordance with claim 1 wherein there is included a standby station for said workpiece engageable means and said robot assembly is operable to effect release and engagement of said workpiece engageable means at said standby station in response to operation of said control means.

4. The combination in accordance with either of claims 1 or 2 wherein said workpiece engageable means has a pair of grippable elements adapted to be engaged by the gripping elements at the opposite ends of said gripping means.

5. The combination in accordance with claim 1 wherein said robot assembly is also movable vertically on said base to position said arm at different heights.

6. The combination in accordance with claim 5 wherein said tool storage magazine has a multiplicity of vertically spaced storage portions and a multiplicity of horizontally spaced storage positions.

7. The combination in accordance with claim 1 wherein said gripping elements of said tool members and of said workpiece engageable means are similarly configured.

8. The combination in accordance with claim 7 wherein said grippable elements are of generally rod-like configuration.

9. The combination in accordance with claim 1 wherein said gripping means is pivotable 180° to locate its axis parallel with that of said arm to utilize one of said gripping elements to engage a first tool member for insertion of its tooling into said tool mounting station and thereafter to utilize the other of said gripping elements to engage a second tool member while a portion of the first tool member remains in said gripping element and the tooling thereof is in use, and is pivotable 90° so that its axis extends perpendicularly to that of said arm to engage said grippable elements of said workpiece engageable means.

10. The combination of claim 1 wherein each of said tool members has a retainer releasably seating a plurality of tools at one end thereof and said grippable element at the other end thereof.

* * * * *